W. BLAIR.
MEANS FOR ATTACHING VEHICLE SPOKE COVERS.
APPLICATION FILED NOV. 8, 1918.
1,390,425.
Patented Sept. 13, 1921.
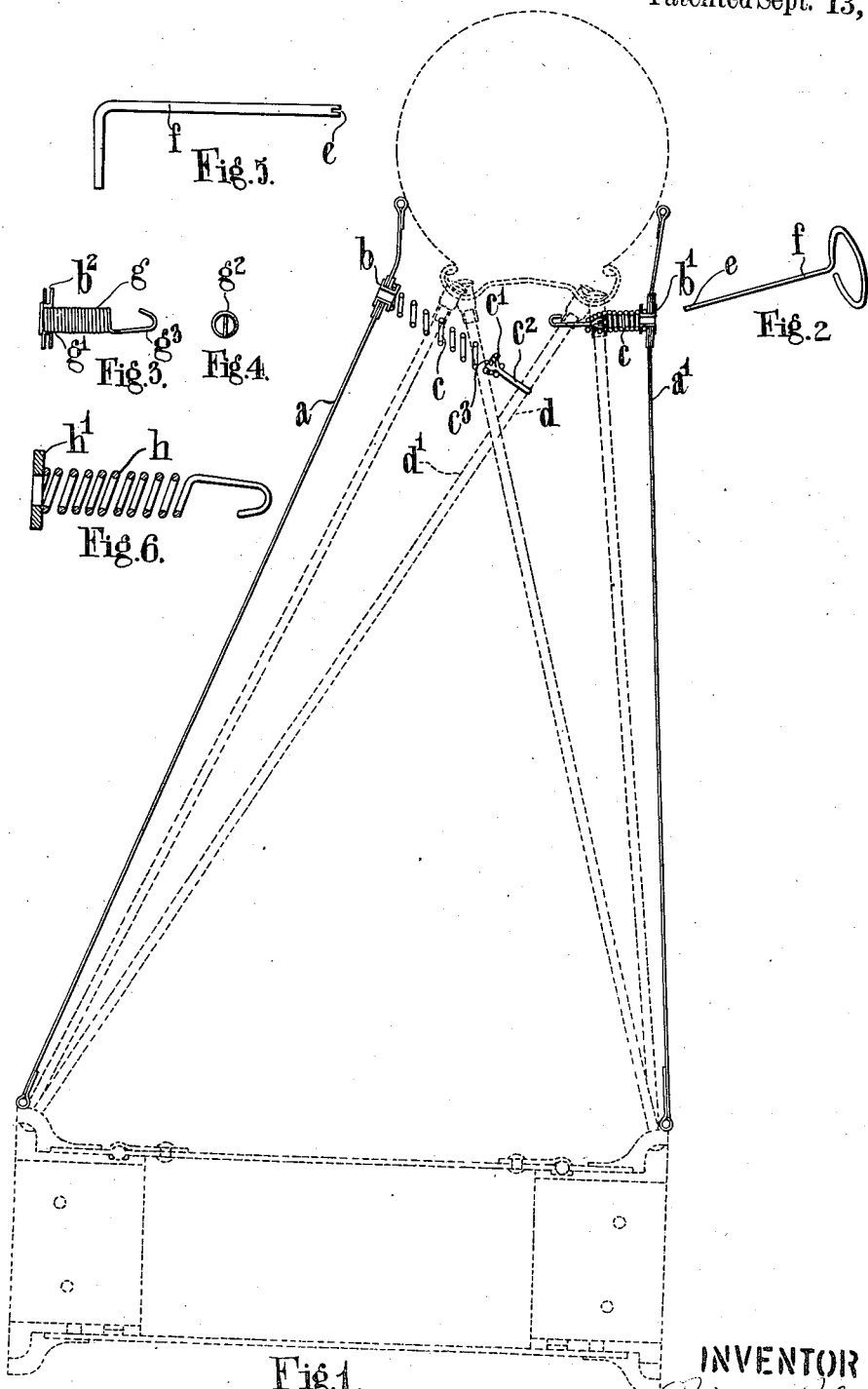

UNITED STATES PATENT OFFICE.

WILLIAM BLAIR, OF COVENTRY, ENGLAND, ASSIGNOR TO RUDGE-WHITWORTH LIMITED, OF CROW LANE, COVENTRY, WARWICK, ENGLAND.

MEANS FOR ATTACHING VEHICLE-SPOKE COVERS.

1,390,425.     Specification of Letters Patent.     Patented Sept. 13, 1921.

Application filed November 8, 1918. Serial No. 261,683.

*To all whom it may concern:*

Be it known that I, WILLIAM BLAIR, a subject of the King of Great Britain and Ireland and residing at Rudge Works, Crow Lane, Coventry, in the county of Warwick, England, have invented a certain new and useful Means for Attaching Vehicle-Spoke Covers, of which the following is a specification.

This invention relates to disks or shields for covering in the spokes of vehicle or like wheels to present a smooth outer surface upon each side of a revolving wheel, and it concerns particularly that type of such disks which principally on account of the flexibility resulting from their lightness of construction are retained with their circumferential edges in contact with the wheel structure by a series of elastic members disposed within the outer circumference of the disk and extended to exert force thereon in an axial direction.

So far, it has been proposed to use such attachment devices for one only of the two disks necessarily employed for covering in the spokes of a wheel as the spiral springs extending inward from the one cover were so formed and attached that they could only be hooked to the spokes of the wheel prior to the remaining cover being placed in position and attached by means accessible from the outer side thereof.

The object of the present invention is to enable such attachment devices to be used for fixing both the disks employed in covering the spokes of a wheel.

The invention includes the novel construction and arrangement and combination of parts hereinafter described and defined by the appended claims, my invention being illustrated in the accompanying drawings, in which—

Figure 1 is a portion of a section through a wire spoked wheel having covering disks attached in accordance with the invention.

Fig. 2 shows a tool suitable for extending the coiled spring attachment devices and engaging them with the spokes.

Fig. 3 shows an alternative form of the coiled springs, and

Figs. 4 and 5 show respectively an end view of the spring shown in Fig. 3 and a tool suitable for manipulating said spring.

Fig. 6 shows another coiled spring of a slightly modified construction.

In carrying the invention into effect as shown by way of example in Fig. 1, $a\ a'$, are a pair of flexible spoke covering disks formed in a suitable manner from woven fabric and having wires inserted around their outer peripheries and the periphery of a concentric central aperture.

The wires inserted in the peripheries of the disks may be elliptical pear-shaped or of other suitable cross-section adapted to fit closely against the side of the tire or the edge of the wheel rim and offer as little resistance as possible to wind.

Each disk near its outer periphery is provided with a series or ring of eyelets $b$, $b'$, preferably spaced at equal distances around the cover, the material at this part, if desired, being reinforced with a ring of tape or the like sewn on to one or both sides of the cover or each hole in the material for an eyelet being reinforced by one or more washers of fabric, metal or other suitable material, the object being to distribute the local stress of the eyelet over as large an area as possible, and thus reduce the possibility of it being detached from its surroundings.

Attached to the inner sides of the eyelets $b$, $b'$ are coiled springs $c$, the one upon the left being extended and hooked to the spoke $d$, while the one upon the right is shown in an unstressed condition prior to its extension and engagement with the spoke $d'$.

The springs $c$ are attached by one coil to the inner sides of the eyelets, and at the other end they are wound upon the conical enlargement $c'$ of the hook $c^2$ which engages a spoke, the hook being free to swivel in the end of the spring and being provided at the end of the enlarged portion $c'$ with a notch or slot $c^3$ adapted to be engaged by the screwdriver end $e$ of a tool $f$ (Fig. 2) which is inserted through the eyelet and down the center of the springs in order to effect their extension and engagement with the spokes.

In the arrangement shown in Figs. 3, 4 and 5, the coiled springs $g$ are of such a diameter that they will pass easily through the eyelets $b^2$, the spring being provided at its outer end with one or more coils $g'$ of a larger diameter which will not pass through the eyelet. At the other end of the coil the wire is first turned diametrically across the coil as shown at $g^2$ (Fig. 4) and then outward and backward into a hook $g^3$ of such dimensions that it will pass through an eyelet and be capable of engaging a spoke. In this construction the springs are manipulated by a tool $f'$ (Fig. 5) having its end slotted at $e'$ to form a fork which engages the diametrical portion of wire $g^2$ in order to extend the spring and turn the hook in the necessary direction to engage a spoke.

In the slightly modified form shown in Fig. 6, a spring $h$ is attached at one end to a washer $h'$ instead of being provided with one or more enlarged coils, in other respects, this spring is similar to the one shown in Figs. 3 and 4.

In the above described arrangement, it is assumed that the end of the wheel hub projects beyond the rim or tire against which the outer periphery of a cover is held as shown in Fig. 1 so that one set of fastenings holds both outer and inner peripheries tightly against the wheel, but in cases where a wheel is greatly dished so that the rim or tire overhangs the end of the hub, the cover for that side should be provided near its inner periphery with eyelet holes and fastenings similar to those already described, so that the whole of its surface may be drawn tightly against the wheel.

It will be seen that many modifications may be made in this invention, and in the manner of carrying it into effect without in any way departing from the spirit of the same.

Having now described my invention, what I claim as new and desire to secure by Letters Patent is:—

1. Means for attaching spoke covers to wheels comprising an eyelet, a coiled spring connected with the eyelet, said spring being provided with a hook.

2. A spoke covering guard for wheels comprising a disk having apertures therein to be attached to the face of a wheel, resilient means engaging said disk at the apertures and attachment devices carried by said resilient means and adapted to be operated by a tool inserted through the apertures to effect the fastening of the said disk to the wheel spokes.

3. A spoke covering guard for wheels comprising disks having apertures therein to be attached to the opposite sides of the wheels, coiled springs engaging said disks at the apertures and hooks carried by said springs and adapted to be operated by a tool inserted through the apertures to effect the fastening of said disks to the wheels.

4. A spoke covering guard for wheels comprising disks having apertures therein to be attached to the opposite sides of the wheels, coiled springs engaging said disks at the apertures and hooks carried by said springs and adapted to be operated by a tool inserted through the apertures and down said springs to extend the springs and effect engagement with the wheel spokes to fasten said disks to the wheels.

In testimony whereof I have signed my name to this specification.

WILLIAM BLAIR.